(12) United States Patent
Hall et al.

(10) Patent No.: US 10,342,337 B2
(45) Date of Patent: *Jul. 9, 2019

(54) COMMUNICATING BINS WITH ELECTRICALLY CONDUCTIVE MEMBERS

(71) Applicant: Hall Labs LLC, Provo, UT (US)

(72) Inventors: David R. Hall, Provo, UT (US);
Andrew Priddis, Mapleton, UT (US);
Joseph Blanch, Provo, UT (US)

(73) Assignee: Hall Labs LLC, Provo, UT (US)

(*) Notice: Subject to any disclaimer, the term of this patent is extended or adjusted under 35 U.S.C. 154(b) by 53 days.

This patent is subject to a terminal disclaimer.

(21) Appl. No.: 15/401,623

(22) Filed: Jan. 9, 2017

(65) Prior Publication Data

US 2018/0192807 A1    Jul. 12, 2018

(51) Int. Cl.
| | | |
|---|---|---|
| *E04B 2/74* | (2006.01) | |
| *H02G 3/10* | (2006.01) | |
| *H02G 3/18* | (2006.01) | |
| *A47B 77/08* | (2006.01) | |
| *A47B 96/14* | (2006.01) | |
| *H01R 33/02* | (2006.01) | |

(52) U.S. Cl.
CPC .......... *A47B 77/08* (2013.01); *A47B 96/1416* (2013.01); *H01R 33/02* (2013.01); *H02G 3/10* (2013.01); *E04B 2002/7483* (2013.01); *H02G 3/18* (2013.01)

(58) Field of Classification Search
CPC .... H01R 13/73; H01R 13/24; H01R 13/3302; H02G 3/20; H02G 3/10; H02G 3/18; F04D 25/088; A47B 77/08; A47B 96/1416; E04B 2002/7483
USPC .................................................. 439/530, 529
See application file for complete search history.

(56) References Cited

U.S. PATENT DOCUMENTS

| | | | | |
|---|---|---|---|---|
| 9,643,782 | B1 * | 5/2017 | Hall ....................... | B65G 1/127 |
| 9,645,569 | B1 * | 5/2017 | Hall ....................... | B65G 1/127 |
| 9,673,575 | B1 * | 6/2017 | Hall ....................... | H01R 13/73 |
| 2012/0062175 | A1 * | 3/2012 | Miller .................... | H02J 50/40 |
| | | | | 320/108 |
| 2016/0020562 | A1 * | 1/2016 | Birdwell ................ | H01R 43/26 |
| | | | | 439/529 |

* cited by examiner

*Primary Examiner* — Gary F Paumen (57) ABSTRACT

The invention is an apparatus comprising a suspendable box, especially a storage bin or appliance, with electrically conductive members mounted thereon that both suspend and supply electrical power to the box. The electrically conductive members comprise insulative housings with openings that attach to wall hooks. Both the members and the wall hooks comprise electrical conductors. When the wall hooks are fitted inside the members, the electrical conductors engage to provide electrical power to the box, simultaneously suspending the box from the wall to which the wall hooks are mounted. The power supplied to the box may power electrical features like outlets, lights, or, especially, a microcontroller with a data transceiver, which allows the box to communicate with other like boxes, robots, or central controllers. The box is ideally suited to function within an automated storage and retrieval system, and preferably has specific dimensions that allow it to do so.

18 Claims, 11 Drawing Sheets

COMMUNICATING BINS WITH ELECTRICALLY CONDUCTIVE MEMBERS

CROSS-REFERENCES

Technical Field

This invention relates generally to the field of storage systems, and more specifically to storage bins.

BACKGROUND

Homes, offices, warehouses, and other buildings are in constant need of more storage space. Areas within the buildings—closets, cupboards, attics, shelves, and the like—are often set apart for this purpose, but these storage spaces are seldom used efficiently or to full capacity. Even when the spaces are used to full capacity, maintaining order and accessibility presents a further challenge. Accordingly, various storage systems have been designed to improve the efficiency, accessibility, and organization of various storage spaces.

One such storage system design is an automated storage and retrieval system. An automated storage and retrieval system allows a user to select a desired item or set of items and instruct that the items be brought by mechanical means from distant storage areas to a convenient access point. In this way, automated storage and retrieval systems provide a convenient method for locating and accessing goods while utilizing space that would otherwise be difficult to access.

Various items can be stored and moved within an automated storage and retrieval system, including free-standing electrical appliances or storage bins holding electrical appliances. However, one disadvantage of an automated storage and retrieval system is that the constant shifting of the items makes it difficult to power the items while they are inside the storage system. Power cords may become tangled, cause safety hazards, and a large mess of cords and corresponding outlets can be a logistical nightmare and an eye-sore. The inability of powering the storage bins or appliances while shifting within the automated storage and retrieval system also makes it difficult to equip the storage bins or appliances with individual electrically powered microcontrollers, which would provide additional advantages, such as allowing the storage items to communicate with each other or with the system.

Some alternative power connections exist that allow appliances of like size to connect to each other without the use of numerous power cords. In these applications, a first appliance is connected to electricity and to a support structure with a power cord, and each subsequent appliance is supported and powered through the first appliance. However, at least one power cord is still needed, additional structural and electrical requirements are placed on the appliance that supports other appliances, and the shifting of the items may still prevent the system from working.

In light of the foregoing, what is needed is a storage item that can be independently supported and powered without the use of a power cord within a storage and retrieval system.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow a storage item to be independently supported and powered within an automated storage and retrieval system.

Consistent with the foregoing, an apparatus is disclosed. The apparatus comprises a suspendable box and one or more electrically conductive members mounted to the suspendable box. Each electrically conductive member comprises an insulative housing, which comprises an opening. The opening comprises a first electrical conductor that is positioned so as to engage with a second electrical conductor within a wall hook. The wall hook is dimensioned to fit removably inside the electrically conductive member. The wall hook is mounted to a wall from which the suspendable box may be removably suspended. The wall hook is also coupled to a source of electrical power within the wall such that the suspendable box is provided with electrical power when the first electrical conductor and the second electrical conductor engage.

The suspendable box may be a storage bin or an electrically powered appliance. The suspendable box may have particular dimensions and may be fitted with electrical outlets, knobs, or microcontrollers which may have data transceivers capable of wireless communication. Preferably, two electrically conductive members, one hot and one neutral, are mounted to the suspendable box, and the first and second electrical conductors comprise spring-loaded pins. Preferably, the suspendable box is one component of an automated storage and retrieval system.

Finally, a system is also disclosed. The system comprises one or more suspendable boxes. Each suspendable box comprises one or more electrically conductive members mounted to the suspendable box and a controller comprising a data transceiver capable of wireless communication, such that the one or more suspendable boxes can communicate with each other via their respective data transceivers. Preferably, the one or more suspendable boxes are components in an automated storage and retrieval system. In one embodiment, the one or more suspendable boxes are cooking devices that communicate so as to synchronize cooking times.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
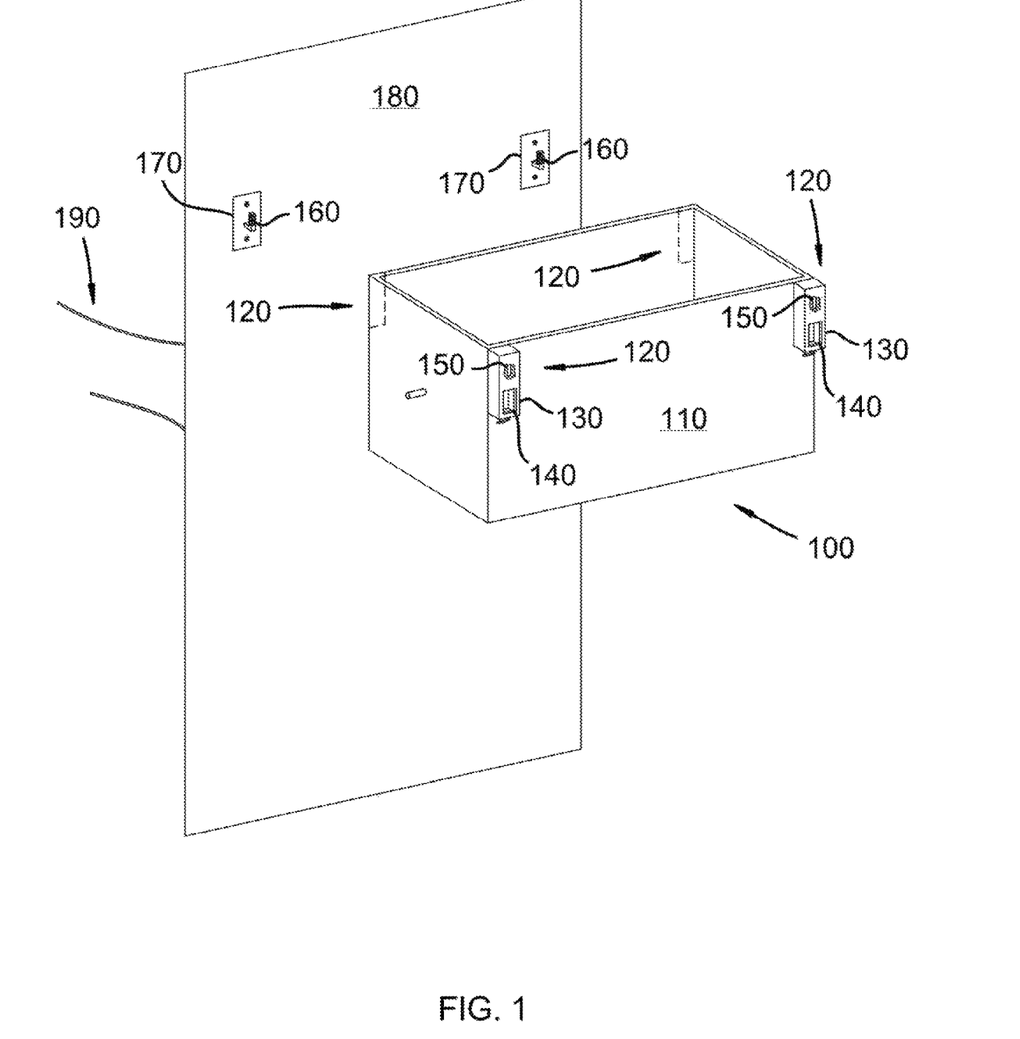
FIG. 1 depicts one embodiment of an apparatus comprising a suspendable box and one or more electrically conductive members mounted to the suspendable box.

FIG. 1 depicts one embodiment of an apparatus 100 comprising a suspendable box 110 and one or more electrically conductive members 120 mounted to the suspendable box 110. Each electrically conductive member 120 comprises an insulative housing 130. The insulative housing 130 comprises an opening 140 comprising a first electrical conductor 150. The first electrical conductor 150 is positioned so as to engage with a second electrical conductor 160 within a wall hook 170, which is dimensioned to fit removably inside the electrically conductive member 120. The wall hook 170 is mounted to a wall 180 from which the suspendable box 110 may be removably suspended. The wall hook 170 is coupled to a source of electrical power 190 within the wall 180 such that the suspendable box 110 is provided with electrical power when the first electrical conductor 150 and the second electrical conductor 160 engage.

Figure 2A:
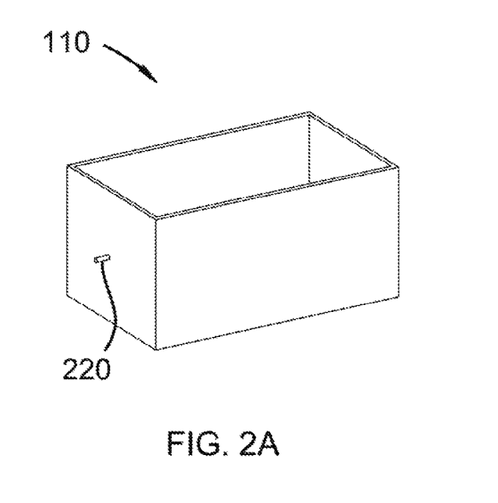
FIG. 2A depicts one embodiment of a storage bin open on top.
Figure 2B:
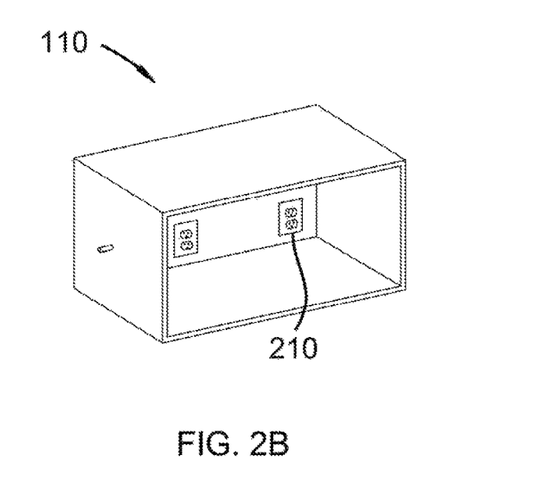
FIG. 2B depicts one embodiment of a storage bin open on a side.
Figure 2C:
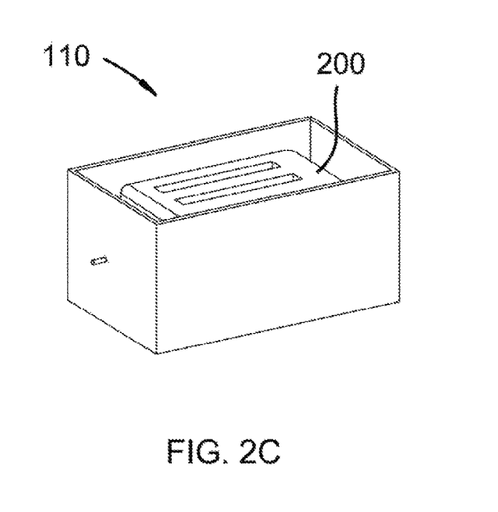
FIG. 2C depicts one embodiment of a storage bin holding an appliance.
Figure 2D:
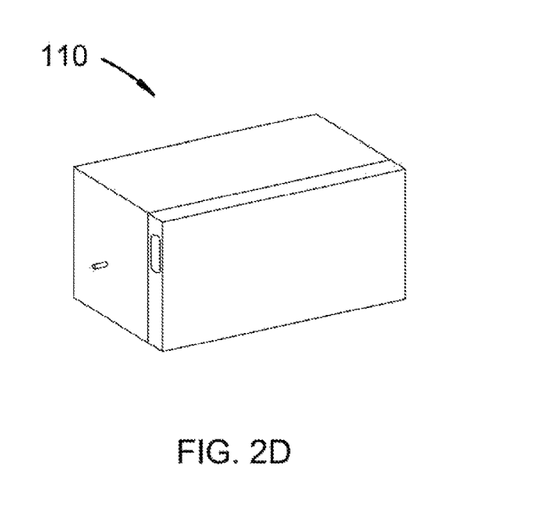
FIG. 2D depicts one embodiment of a suspendable box that is an electrically powered appliance, specifically a refrigerator.

FIG. 2A-FIG. 2D depict embodiments of a suspendable box 110. In a preferred embodiment, the suspendable box 110 comprises a storage bin. A storage bin is a container, with one open side, in which items, including appliances, may be placed for holding. The open side may be on top or on another side. FIG. 2A depicts a storage bin open on top. FIG. 2B depicts a storage bin open on a side. FIG. 2C depicts a storage bin holding an appliance 200. In other embodiments, the suspendable box 110 comprises an electrically powered appliance. The electrically powered appliance may be selected from a group consisting of microwaves, refrigerators, ice machines, heaters, toasters, mixers, ovens, juicers, dryers, grinders, dispensers, freezers, gas and electric cook tops, gas and electric ranges, bread machines, humidifiers, grills, sewing machines, irons, and coolers. FIG. 2D depicts a suspendable box 110 that is an electrically powered appliance, specifically a refrigerator. In a preferred embodiment, the suspendable box 110 is in a rectangular prismatic configuration. In one embodiment, the suspendable box 110 measures approximately twelve inches (30.48 cm.) tall. In one embodiment, the suspendable box 110 measures approximately twelve inches (30.48 cm.) deep. In one embodiment, the suspendable box 110 measures approximately twenty inches (50.8 cm.) wide. In a preferred embodiment, the suspendable box 110 measures approximately twelve inches (30.48 cm.) tall, twelve inches (30.48 cm.) deep, and twenty inches (50.8 cm.) wide. These dimensions are just large enough to fit nearly any general kitchen appliance within the suspendable box 110. They are also crucial dimensions for allowing the suspendable box 110 to be used in an automatic storage and retrieval system, as described in below. In a preferred embodiment, the suspendable box 110 weighs up to approximately 20 pounds (9.07 kilograms). In some embodiments, the suspendable box 110 comprises a lightweight metal, such as aluminum, magnesium, titanium, beryllium alloys, or combinations thereof. In another embodiment, the suspendable box 110 comprises plastic. In a preferred embodiment, the suspendable box 110 comprises one or more knobs 220 that engage with one or more end effectors of one or more robotic mechanisms. By means of the one or more knobs 220, one or more end effectors of one or more robotic mechanisms can lift the suspendable box 110. In one embodiment, the suspendable box 110 comprises one or more electrical outlets 210 having contacts engageable with contacts of a power cord. The one or more electrical outlets 210 may be connected into the power provided to the suspendable box 110 when the first electrical conductor 150 and the second electrical conductor 160 engage. Electrically powered appliances can then be plugged into the one or more electrical outlets 210 to receive power from the suspendable box 110.

Figure 3A:
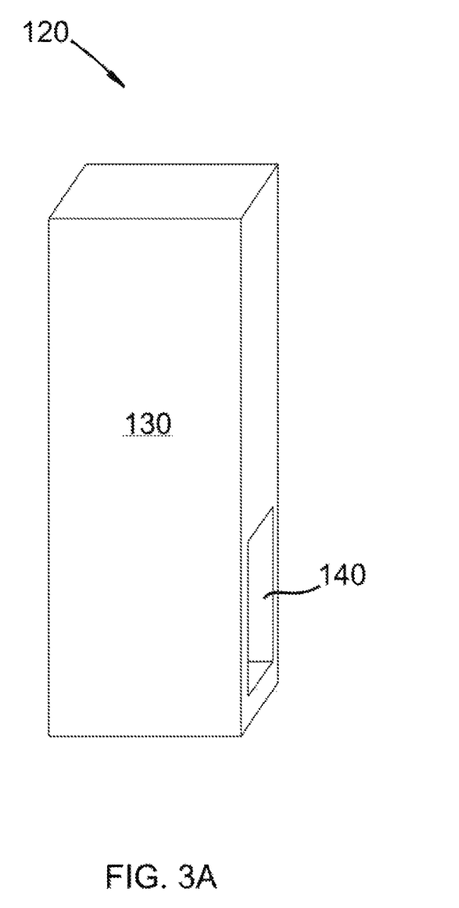
FIG. 3A depicts one embodiment of an exterior view of an electrically conductive member.
Figure 3B:
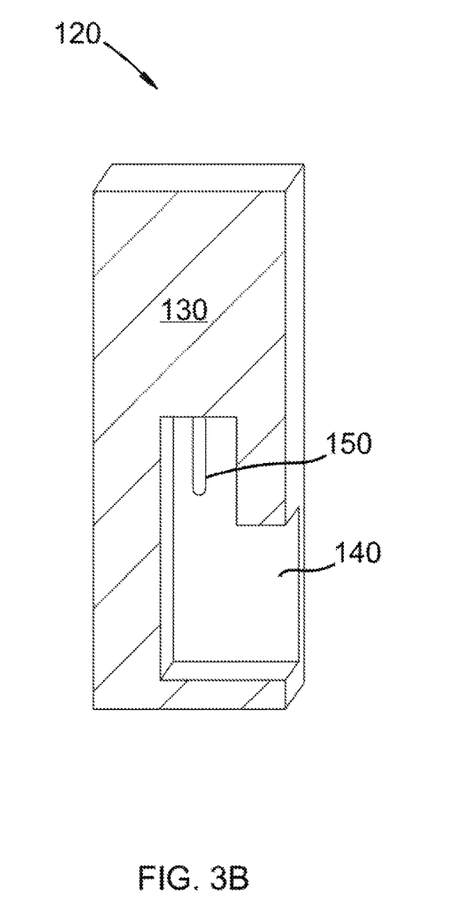
FIG. 3B depicts one embodiment of an interior view of an electrically conductive member.

FIG. 3A and FIG. 3B depict embodiments of the one or more electrically conductive members 120. FIG. 3A depicts an exterior view. FIG. 3B depicts an interior view. In one embodiment, the one or more electrically conductive members 120 are those which are described in patent specification No. U.S. Ser. No. 15/277,090, Electrically Conductive Wall Hooks, which is commonly owned by the Applicant and incorporated by reference for all that it teaches. Each electrically conductive member 120 comprises an insulative housing 130. In some embodiments, the insulative housing 130 comprises plastic or rubber. The preferred embodiment comprises plastic. In a preferred embodiment, the insulative housing 130 comprises a rectangular prismatic configuration. Other embodiments comprise other configurations. In a preferred embodiment, the insulative housing 130 measures approximately 1.5 inches (3.81 cm.) high by 0.3 inches (0.76 cm.) wide by 0.5 inches (1.27 cm.) deep. In one embodiment, the insulative housing 130 is manufactured as part of the suspendable box 110. For example, walls of the suspendable box 110 may comprise the one or more electrically conductive members 120. The insulative housing 130 comprises an opening 140, which comprises a first electrical conductor 150. In a preferred embodiment, the first electrical conductor 150 comprises a pin. In a preferred embodiment, the pin is a spring-loaded pin. The flexibility of a spring-loaded pin ensures that a secure electrical connection will be established when the first electrical conductor 150 and the second electrical conductor 160 approach each other to engage. In another embodiment, the first electrical conductor 150 comprises a receptacle that can engage with a pin. The first electrical conductor 150 is positioned so as to mate with a second electrical conductor 160 within a wall hook 170 mounted to a wall 180. The wall hook 170 is dimensioned to fit removably inside the opening 140 of the electrically conductive member 120. For that reason, in a preferred embodiment, the opening 140 is shaped like a hook. In a preferred embodiment, the first electrical conductor 150 protrudes from the top of the hook-shaped opening 140 down into the opening 140.

Figure 4A:
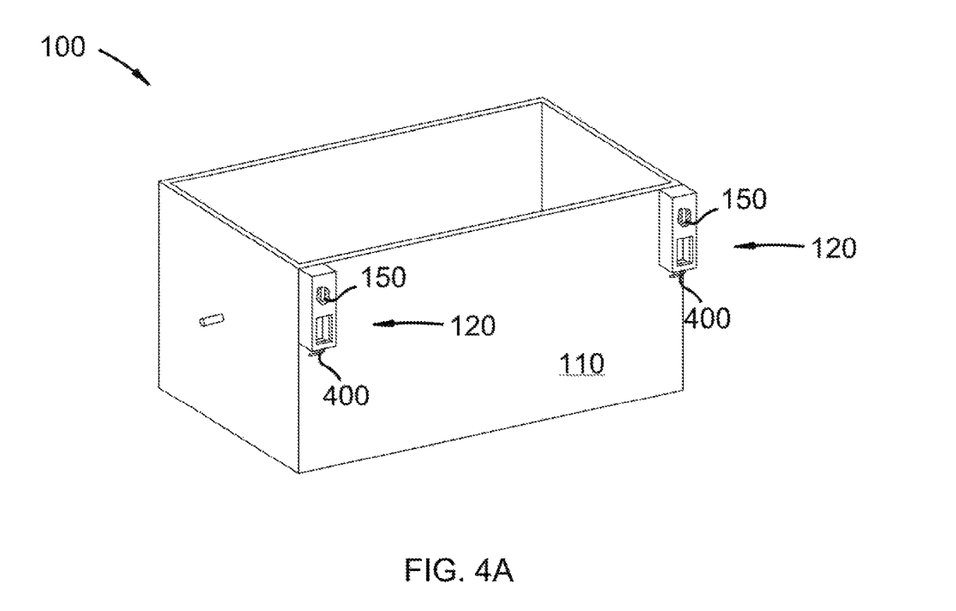
FIG. 4A depicts one embodiment of the one or more electrically conductive members mounted to the outside of the suspendable box.
Figure 4B:
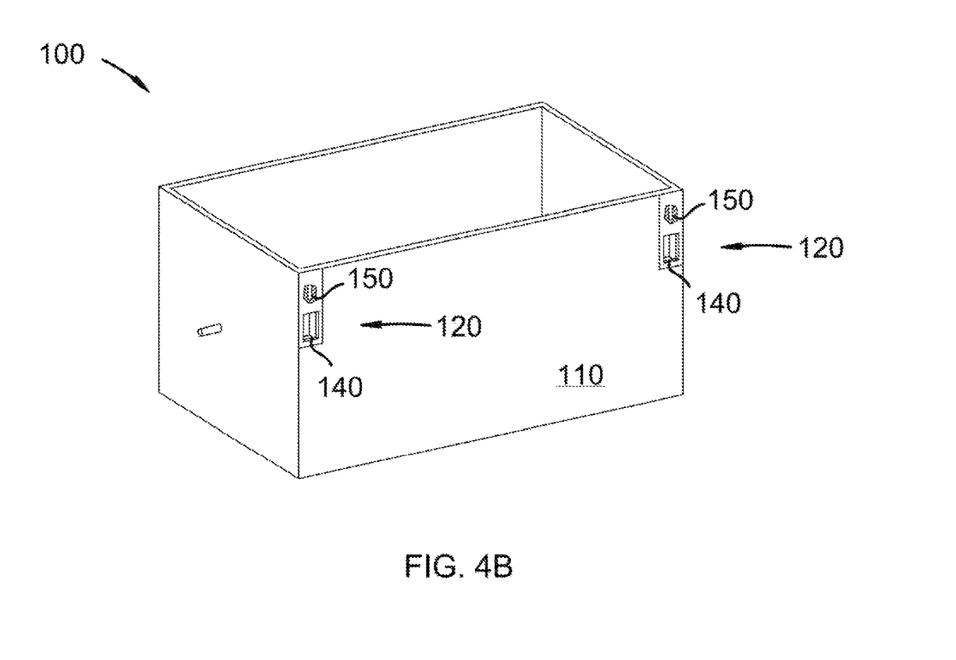
FIG. 4B depicts one embodiment of the one or more electrically conductive members mounted to the inside of the suspendable box.

FIG. 4A and FIG. 4B depict embodiments of the one or more electrically conductive members 120 mounted to the suspendable box 110. In a preferred embodiment, two electrically conductive members 120 are mounted to the suspendable box 110. Preferably, one electrically conductive member 120 is connected to hot wires and a second electrically conductive member 120 is connected to neutral wires, allowing for a complete electrical circuit. In a preferred embodiment, the two electrically conductive members 120 are between approximately seventeen and twenty inches apart, preferably approximately nineteen and one-half inches apart, located on the periphery of the suspendable box 110. The two electrically conductive members 120 are vertically and horizontally collinear. These placements ensure that any load inside the suspendable box 110 will be adequately supported, even if the load is unbalanced. These placements also allow the suspendable box 110 to be utilized in an automatic storage and retrieval system, as described below. In another embodiment, just one electrically conductive member 120 is connected to both hot wires and neutral wires. In another embodiment, four electrically conductive members 120 are mounted to the suspendable box 110, with two electrically conductive members 120 on a front side of the suspendable box 110 and two electrically conductive members 120 on a back side of the suspendable box 110. This embodiment allows the apparatus 100 to be suspended from a wall 180 from either a front side or a back side of the suspendable box 110. This is especially useful if the suspendable box 110 is being shuffled within an automated storage and retrieval system. Other embodiments have a different number of electrically conductive members 120. The one or more electrically conductive members 120 can be mounted in a variety of ways. In one embodiment, the one or more electrically conductive members 120 are mounted to the outside of the suspendable box 110, such that the one or more electrically conductive members 120 protrude from the suspendable box 110. FIG. 4A depicts this embodiment. In this embodiment, electrical wires 400 extend from a first electrical conductor 150 inside the one or more electrically conductive members 120 into the suspendable box 110, seen or unseen, to provide the suspendable box 110 with electrical power. Preferably, hot electrical wires extend from the first electrical conductor 150 inside one electrically conductive member 120, and neutral electrical wires extend from the first electrical conductor 150 inside a second electrically conductive member 120 mounted to the suspendable box 110, such that a complete electrical circuit is created between two electrically conductive members 120 that are mounted to the suspendable box 110. In a preferred embodiment, the one or more electrically conductive members 120 are mounted to the inside of the suspendable box 110, such that only the opening 140 is visible from an outside view of the suspendable box 110. This embodiment is depicted in FIG. 4B. The one or more electrically conductive members 120 mounted to the inside of the suspendable box 110 may be manufactured as part of the suspendable box 110. For example, walls of the suspendable box 110 may comprise the one or more electrically conductive members 120. In one embodiment, electrical wires 400 extend from the first electrical conductor 150 inside the one or more electrically conductive members 120 into the suspendable box 110, unseen, connecting the suspendable box 110 to electrical power. In one embodiment, walls of the suspendable box 110 are double-thick, and the wires 400 run in between the walls to outlets, lights, controllers, etc. that are mounted to and powered by the suspendable box 110. Again, preferably hot electrical wires extend from the first electrical conductor 150 inside one electrically conductive member 120, and neutral electrical wires extend from the first electrical conductor 150 inside a second electrically conductive member 120 mounted to the suspendable box 110, such that a complete electrical circuit is created between the two electrically conductive members 120 that are mounted to the suspendable box 110.

Figure 5:
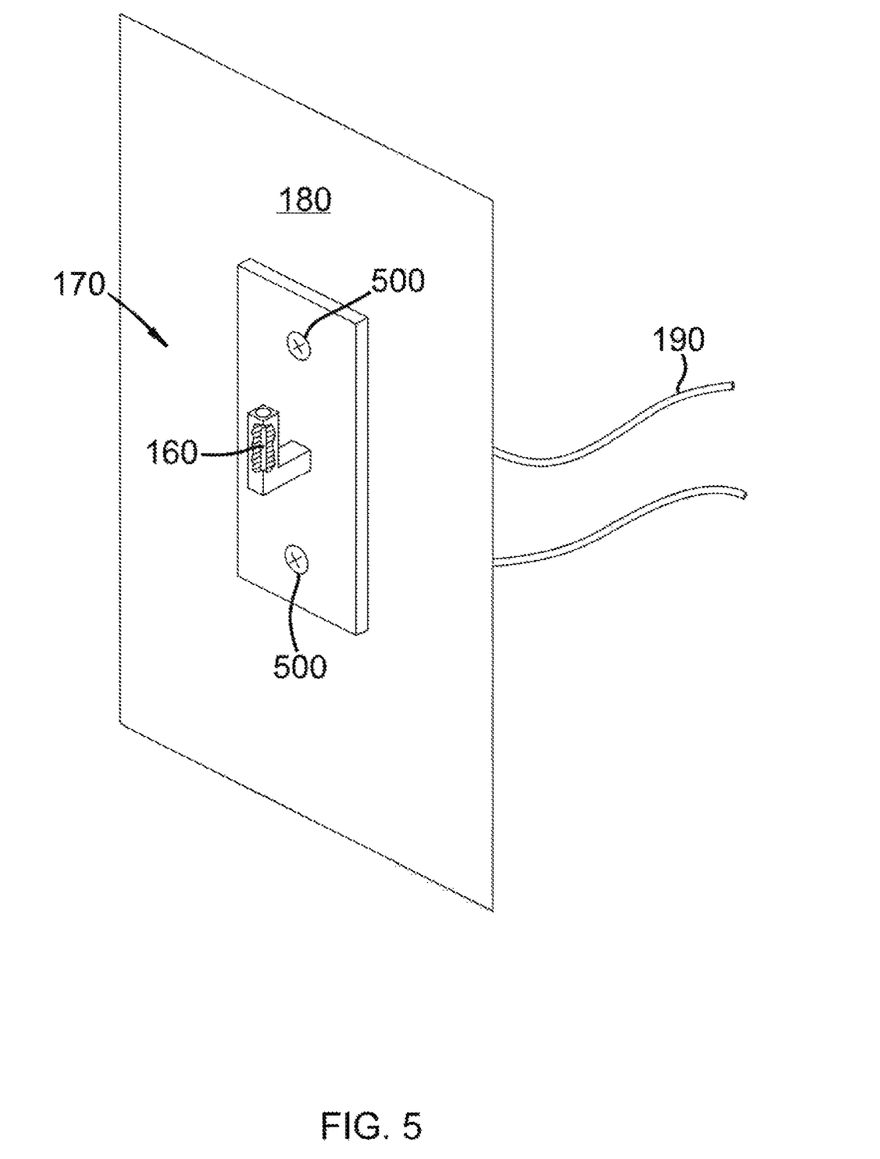
FIG. 5 depicts one embodiment of a wall hook.

FIG. 5 depicts one embodiment of a wall hook 170. In one embodiment, the wall hook 170 is that which is described in patent specification No. U.S. Ser. No. 15/277,090, Electrically Conductive Wall Hooks, which is commonly owned by the Applicant and incorporated by reference for all that it teaches. The wall hook 170 is mounted to a wall 180 from which the suspendable box 110 may be removably suspended. The suspendable box 110 is suspended by means of the wall hook 170. In one embodiment, the wall hook 170 is mounted to the wall 180 with fasteners 500, comprising screws, nails, bolts, rivets, pins, sockets, or anchors. The wall hook 170 is dimensioned to fit removably inside the opening 140 of the one or more electrically conductive members 120. The suspendable box 110 may be removably suspended from the wall 180 when the wall hook 170 is fitted removably inside the opening 140 of the one or more electrically conductive members 120 mounted to the suspendable box 110. In one embodiment, the wall hook 170 comprises an insulating material, preferably plastic. In one embodiment, the wall hook 170 protrudes from the wall 180 at a ninety-degree angle. In one embodiment, the wall hook 170 supports up to twenty pounds (9.07 kilograms) of weight. Within the wall hook 170 is a second electrical conductor 160 that is coupled to a source of electrical power 190. The second electrical conductor 160 is positioned so as to mate with the first electrical conductor 150 of the electrically conductive member 120 when the wall hook 170 is fitted removably inside the opening 140 of the one or more electrically conductive members 120. In a preferred embodiment, the second electrical conductor 160 comprises a pin. In a preferred embodiment, the pin comprises a spring-loaded pin. The flexibility of a spring-loaded pin ensures that the pin will establish a secure electrical connection when the first electrical conductor 150 and the second electrical conductor 160 approach each other to engage. In another embodiment, the second electrical conductor 160 comprises a receptacle that can engage with a corresponding pin. The source of electrical power 190 that is coupled to the wall hook 170 is located within the wall 180. In one embodiment, the source of electrical power 190 comprises electrical wires, at least one of either hot or neutral. In a preferred embodiment, two electrically conductive members 120 are mounted to each suspendable box 110, one hot and one neutral. These two electrically conductive members 120 align with two wall hooks 170 mounted to the wall 180. The two wall hooks are, preferably, vertically and horizontally collinear. In this preferred embodiment, hot electrical wires extend to the second electrical conductor 160 inside one wall hook 170, and neutral electrical wires extend to the second electrical conductor 160 inside a second wall hook 170. The hot wall hook 170 aligns with the hot electrically conductive member 120. The neutral wall hook 170 aligns with the neutral electrically conductive member 120. This allows a complete electrical circuit to be created extending from the source of electrical power 190. In one embodiment, the wall 180 to which each wall hook 170 is mounted comprises two metal rails, such as busbars, one wired to be hot and the other one wired to be neutral. The wall hooks 170 are mounted on these rails. In one embodiment, the source of electrical power 190 is equipped with a ground fault circuit interrupter (GFCI).

Figure 6:
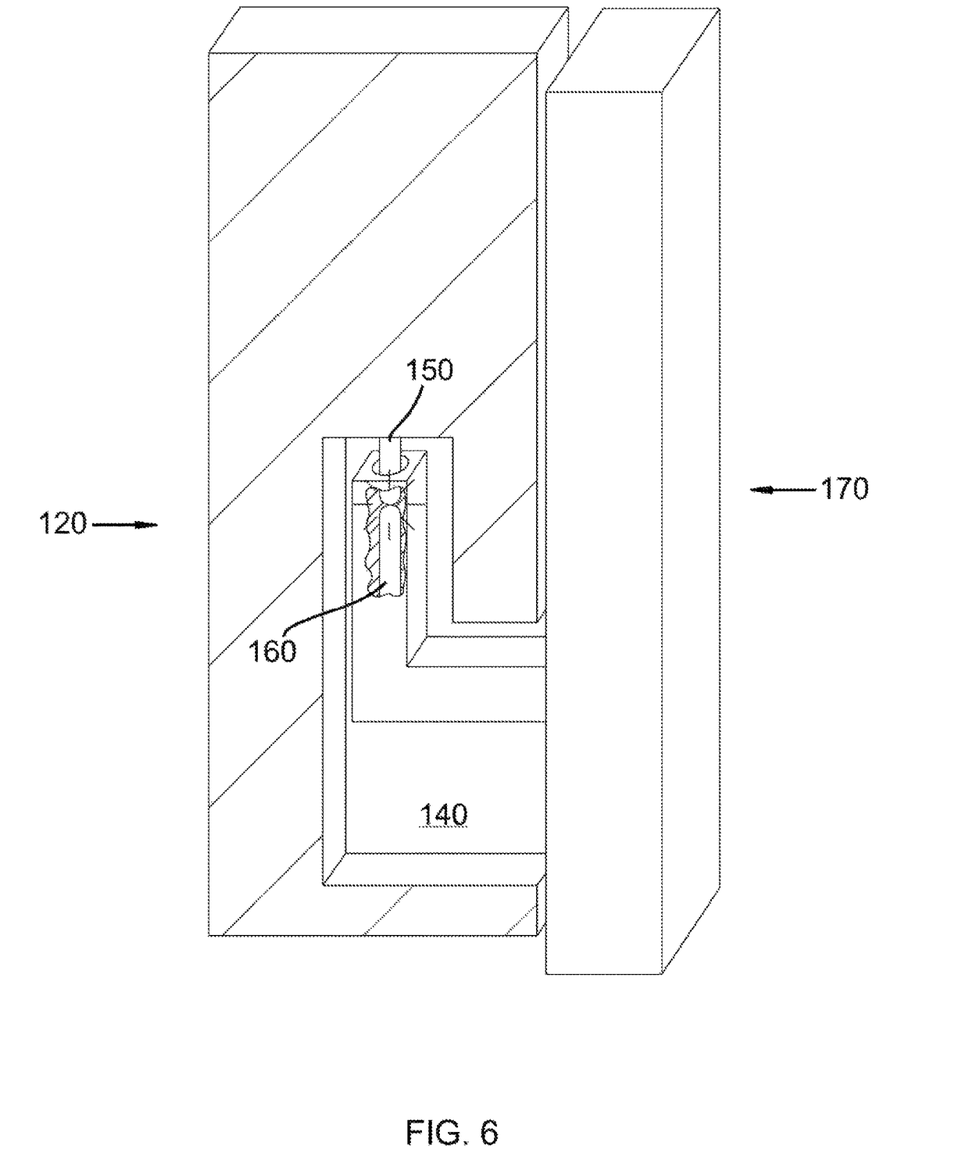
FIG. 6 depicts one embodiment of a wall hook fitted removably inside an electrically conductive member and the first electrical conductor positioned so as to engage with the second electrical conductor within the wall hook.

FIG. 6 depicts one embodiment of the wall hook 170 fitted removably inside an electrically conductive member 120 and the first electrical conductor 150 positioned so as to engage with the second electrical conductor 160 within the wall hook 170. The wall hook 170 is dimensioned to fit removably inside the opening 140 of the electrically conductive member 120. After the wall hook 170 is inserted into the opening 140, because the opening 140 extends upward beyond the top of the wall hook 170, the electrically conductive member 120 shifts downward with the weight of the suspendable box 110 until the electrically conductive member 120 catches on the wall hook 170. At that point, the suspendable box 110 is suspended from the wall hook 170. Also at that point, the first electrical conductor 150 and the second electrical conductor 160 engage, creating an electrical current, which provides electrical power from the source of electrical power 190 within the wall 180 to which the wall hook 170 is coupled to the suspendable box 110, which is suspended from the wall 180 by means of the wall hook 170 fitted removably inside the opening 140 of the electrically conductive member 120. In one embodiment, the first and second electrical conductors 150 and 160 are pins, preferably spring-loaded pins. In another embodiment, the first and second electrical conductors 150 and 160 comprise a pin and a pin receptacle.

Figure 7A:
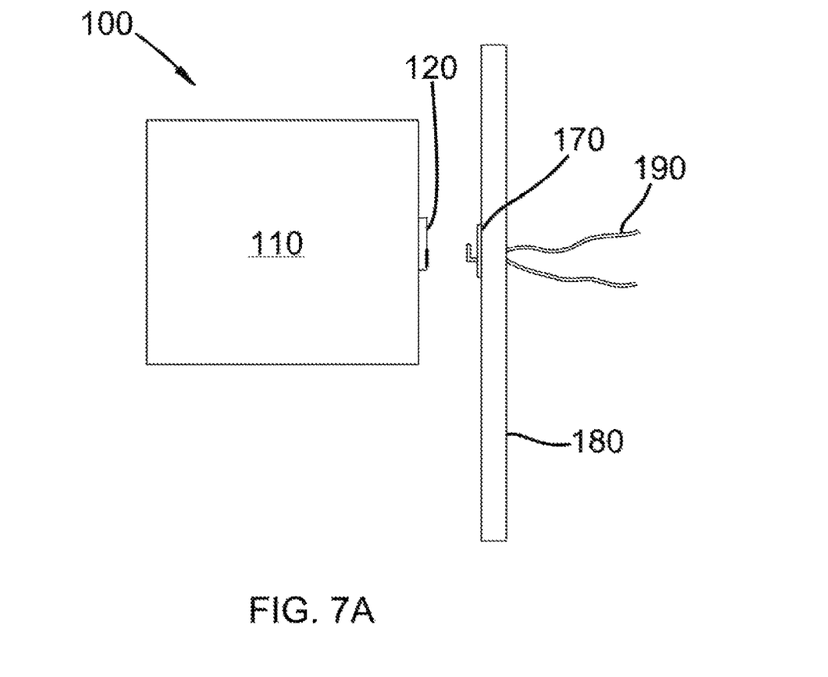
FIG. 7A depicts a side view of one embodiment of the apparatus being suspended from a wall.
Figure 7B:
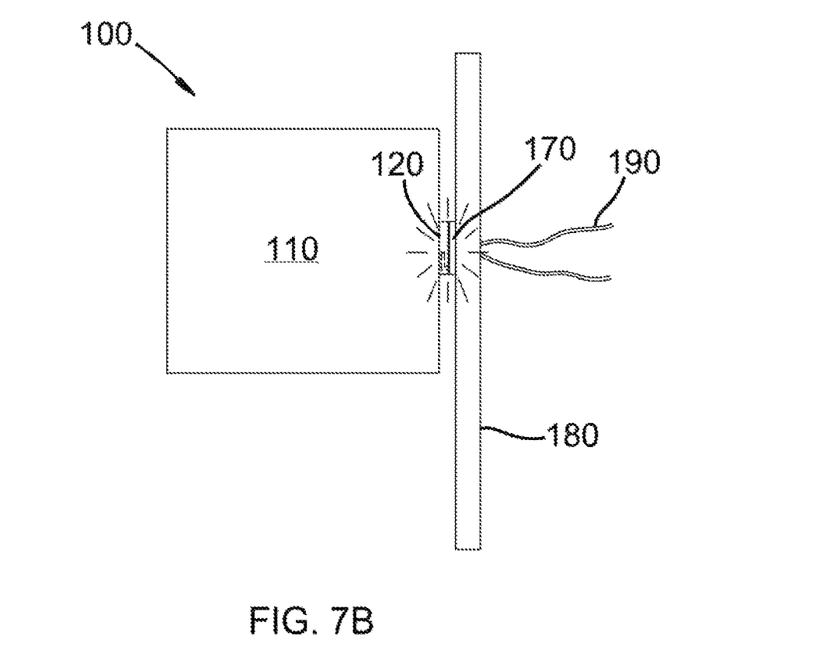
FIG. 7B depicts a side view of one embodiment of the apparatus being suspended from a wall.

FIG. 7A and FIG. 7B depict side views of one embodiment of the apparatus 100 being suspended from a wall 180. FIG. 7A depicts the apparatus 100, comprising one or more electrically conductive members 120 mounted to the suspendable box 110, and a wall hook 170 that is mounted to the wall 180. The one or more electrically conductive members 120 comprise an insulative housing 130 comprising an opening 140. The wall hook 170 is dimensioned to fit removably inside the opening 140 of the one or more electrically conductive members 120. When the wall hook 170 is fitted removably inside the opening 140, the suspendable box 110 is suspended from the wall 180, as depicted in FIG. 7B. The one or more electrically conductive members 120 also comprise first electrical conductors 150. The wall hook 170 comprises a second electrical conductor 160 that is coupled to a source of electrical power 190 within the wall 180. The first electrical conductor 150 and the second electrical conductor 160 are positioned so as to engage when the wall hook 170 is fitted removably inside the opening 140. In this way, the suspendable box 110 is provided with electrical power when it is hung on the wall 180, without the need for other outlets, power cords, or plugs. The power can be used, if the suspendable box 110 is an appliance, to power the suspendable box 110. Alternatively, the power can be used to power features of the suspendable box 110, such as outlets, lights, or controllers. In one embodiment, the source of electrical power 190 comprises electrical wires, one hot and one neutral. In a preferred embodiment, the suspendable box 110 is suspended from two wall hooks 170. In this preferred embodiment, hot electrical wires extend to the second electrical conductor 160 inside one wall hook 170, and neutral electrical wires extend to the second electrical conductor 160 inside a second wall hook 170. This allows a complete electrical circuit to be created extending from the source of electrical power 190. In one embodiment, the wall 180 to which each wall hook 170 is mounted comprises two metal rails, such as busbars, one wired to be hot and the other one wired to be neutral. The wall hooks 170 are mounted on these rails. In one embodiment, the source of electrical power 190 is equipped with a ground fault circuit interrupter (GFCI).

Figure 8:
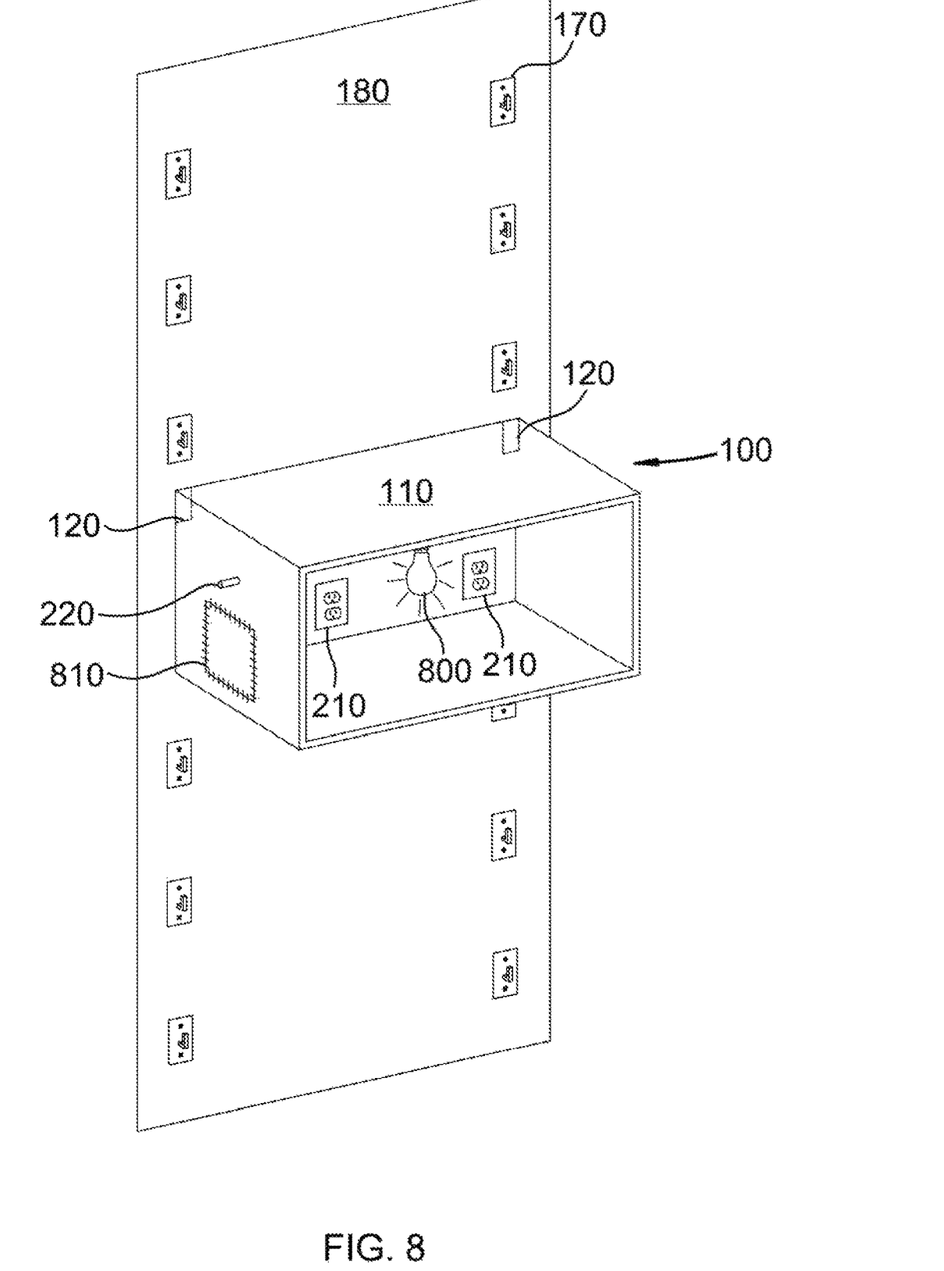
FIG. 8 depicts a front view of one embodiment of the apparatus being suspended from a wall.

FIG. 8 depicts a front view of one embodiment of the apparatus 100 being suspended from a wall 180. The apparatus 100 comprises a suspendable box 110 and one or more electrically conductive members 120 mounted to the suspendable box 110. Each electrically conductive member 120 corresponds with a wall hook 170 mounted to the wall 180. The suspendable box 110 is removably suspended from the wall 180 by means of the wall hooks 170, which are fitted removably inside the one or more electrically conductive members 120 mounted to the suspendable box 110. Each electrically conductive member 120 comprises a first electrical conductor 150. Within each wall hook 170 is a second electrical conductor 160 coupled to a source of electrical power 190 within the wall 180. Each first electrical conductor 150 is positioned so as to mate with a second electrical conductor 160 within a wall hook 170. When the first electrical conductor 150 and the second electrical conductor 160 engage, the suspendable box 110 is provided with electrical power. This power is supplied without the need for other outlets, power cords, or plugs. The power can be used, if the suspendable box 110 is an appliance, to power the suspendable box 110. Alternatively, the power can be used to power features of the suspendable box 110, such as outlets 210, lights 800, controllers 810, or other electrically powered components. In one embodiment, the apparatus 100 comprises one or more electrical outlets 210 having contacts engageable with contacts of a power cord. In one embodiment, the one or more electrical outlets 210 are mounted to the suspendable box 110. The one or more electrical outlets 210 may be connected into the power provided to the suspendable box 110 when the first electrical conductor 150 and the second electrical conductor 160 engage. The electrical outlets 210 may be connected to the power by extending wires from the first electrical conductor 150 inside the one or more electrically conductive members 120 to the one or more electrical outlets. In one embodiment, walls of the suspendable box 110 are double-thick, and the wires run in between the walls to the one or more electrical outlets 210. In a preferred embodiment, hot wires run from one electrically conductive member 120 and neutral wires run from another electrically conductive member 120 to the one or more electrical outlets 210. Electrically powered appliances can then be plugged into the one or more electrical outlets 210 to receive power from the suspendable box 110. In a preferred embodiment, the apparatus 100 comprises a controller 810. Preferably, the controller 810 comprises a data transceiver capable of wireless communication. The controller 810 and the data transceiver allow the suspendable box 110 to communicate with robotic mechanisms, central computing systems, or with other suspendable boxes 110. The suspendable box 110 may communicate through the data transceiver by means of wireless, Bluetooth, or other means commonly known by persons of skill in the art. Preferably, the suspendable box 110 communicates by means of Bluetooth. Preferably, the controller 810 is also connected into the power provided to the suspendable box 110 when the first electrical conductor 150 and the second electrical conductor 160 engage. The controller 810 may be connected to the power by extending wires from the first electrical conductor 150 inside the one or more electrically conductive members 120 to the controller 810. In one embodiment, walls of the suspendable box 110 are double-thick, and the wires run in between the walls to the controller 810. In a preferred embodiment, hot wires run from one electrically conductive member 120 and neutral wires run from another electrically conductive member 120 to the controller 810. An AC-DC adapter should be placed along the circuit between the first electrical conductors 150 and the controller 810.

Figure 9:
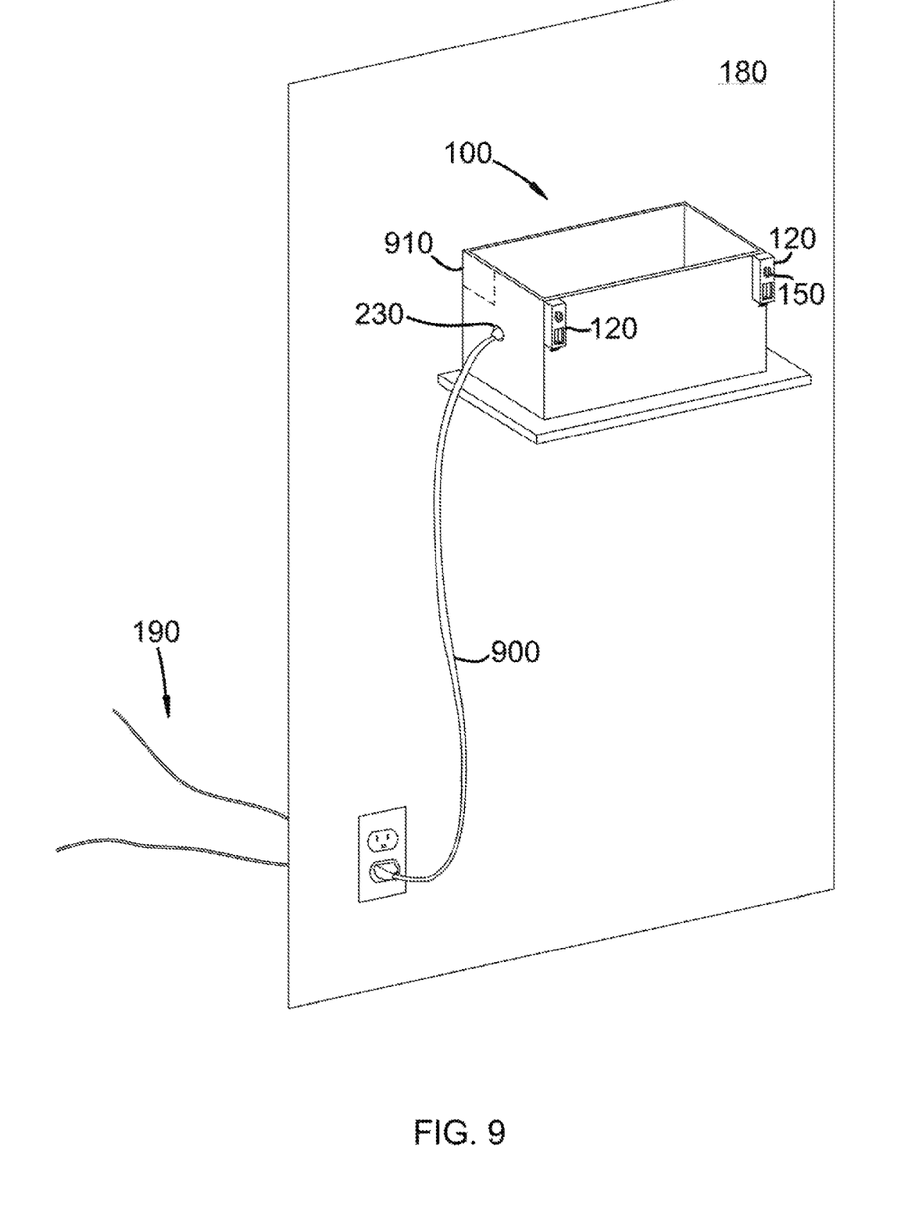
FIG. 9 depicts one embodiment of the apparatus comprising one or more sockets, having contacts engageable with contacts of a detachable power cord.

FIG. 9 depicts one embodiment of the apparatus 100 comprising one or more sockets 230, having contacts engageable with contacts of a detachable power cord 900, such as a pigtail adapter, that connects separately to a source of electrical power. The invented apparatus 100 is generally supplied with electrical power when it is hung on the wall 180 by means of the first electrical conductor 150 inside the one or more electrically conductive members 120 engaging with the second electrical conductor 160 inside the wall hooks 170 that are mounted to the wall 180, thus eliminating the need for other outlets or power cords. However, it is possible that in some circumstances, a user might need to use the invented apparatus 100 in a context where a wall hook 170 is not available. Therefore, the ability to use a traditional outlet and power cord would, in some circumstances, be desirable. An embodiment of the apparatus 100 comprising one or more sockets 230 makes it possible that, when the suspendable box 110 is not suspended from the wall hooks 170, the suspendable box 110 can still be provided with electrical power by plugging the detachable power cord 900 into the one or more sockets 230 of the suspendable box 110 and into an available conventional electrical outlet. In one embodiment, the apparatus 100 further comprises a battery 910. In this embodiment, the suspendable box 110 may be powered by means of the battery 910 as well. This allows the suspendable box 110 to be used with greater versatility. It allows the suspendable box 110 to be continually powered even when being repeatedly hung and unhung from the wall hooks 170, which would otherwise cause the power supply to be intermittent. In a preferred embodiment, the apparatus 100 can be powered by means of the first electrical conductor 150 inside the one or more electrically conductive members 120 engaging with the second electrical conductor 160 inside the wall hooks 170 when the apparatus is suspended by the wall hooks 170 on the wall 180, by means of one or more sockets 230 connected to a detachable power cord 900, and by means of a battery 910.

Figure 10:
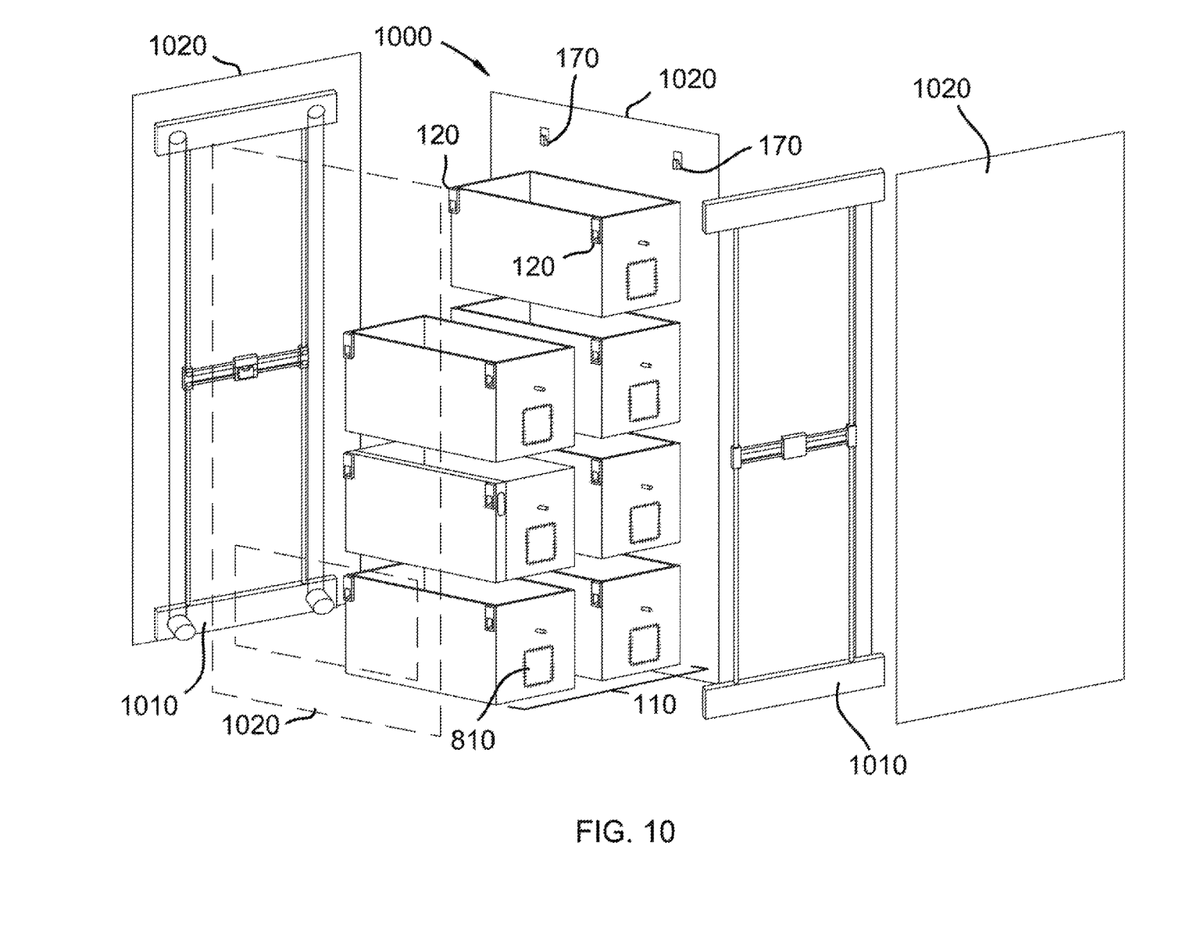
FIG. 10 depicts one embodiment of the suspendable box as one component in an automated storage and retrieval system.

FIG. 10 depicts one embodiment of the suspendable box 110 as one component in an automated storage and retrieval system 1000, which is a preferred embodiment. In a preferred embodiment, the suspendable box 110 measures approximately twelve inches tall, twelve inches deep, and twenty inches wide. A suspendable box 110 of this size is dimensioned to fit within an automated storage and retrieval system 1000, especially in those described in Automatic Storage and Retrieval System with Planar Motion Mechanism, patent specification No. U.S. Ser. No. 15/248,589; Automated Storage and Retrieval Direct Movement Method, patent specification No. U.S. Ser. No. 15/260,979; and Automated Storage and Retrieval System with Retractable Mountings, patent specification No. U.S. Ser. No. 15/278,545 which are commonly owned by the Applicant and incorporated by reference for all that they teach. Each of these cited automatic storage and retrieval systems is designed to fit within a condensed kitchen, providing all necessary storage space within the kitchen. The dimensions are critical so that the kitchen and the storage system are big enough for functionality, but small enough for convenience. To fit within the overall system, the suspendable box 110 must fit these critical dimensions. Preferably, the automated storage and retrieval system 1000 is that which is described in Automatic Storage and Retrieval System with Planar Motion Mechanism, patent specification No. U.S. Ser. No. 15/248,589; Automated Storage and Retrieval Direct Movement Method, patent specification No. U.S. Ser. No. 15/260,979; or Automated Storage and Retrieval System with Retractable Mountings, patent specification No. U.S. Ser. No. 15/278,545. In a preferred embodiment, the automated storage and retrieval system 1000 comprises one or more planar motion mechanisms 1010 movably mounted to a frame 1020, wall hooks 170 mounted to one or more walls of the frame 1020, and the one or more planar motion mechanisms 1010 suspending the suspendable box 110 from the wall hooks 170 to reposition the suspendable box 110 within the frame 1020. In one embodiment, the one or more planar motion mechanisms 1010 are H-bots. One or more electrically conductive members 120 are mounted to each suspendable box 110. Each suspendable box 110 is suspended from the wall hooks 170 by fitting the wall hooks 170 removable inside the one or more electrically conductive members 120. First electrical conductors 150 within the one or more electrically conductive members 120 and second electrical conductors 160 within the wall hooks 170 engage when a suspendable box 110 is suspended from the wall 180 by means of the wall hooks 170, connecting the suspendable box 110 to electrical power while suspended. Using the invented apparatus 100 in an automated storage and retrieval system 1000 in this way allows each suspendable box 110 that is a component of the automated storage and retrieval system 1000 to be connected to electrical power during storage, without regard for where the suspendable box 110 is moved within the storage area. For example, if the suspendable box 110 is an appliance, such as a bread machine, a user could add ingredients to the bread machine and instruct the bread machine to start a bread making cycle. Then, the user could insert the bread machine into the automated storage and retrieval system 1000. As the bread machine is stored, it would have a nearly continuous supply of electrical power from the wall hooks 170 that would enable the bread machine to complete the bread making cycle even while being stored and moved around within the automated storage and retrieval system 1000. The same would be true of a refrigerator or an oven. If the suspendable box 110 is a storage bin, features of the storage bin, such as outlets 210, lights 800, controllers 810, or other electrically powered components, can be powered nearly continuously while the storage bin is stored and moved around within the automated storage and retrieval system 1000. For example, in a preferred embodiment, the suspendable box 110 comprises a controller 810, which preferably comprises a data transceiver capable of wireless communication. The controller 810 can be nearly continuously powered while the suspendable box 110 is circulating inside the automated storage and retrieval system 1000, allowing each suspendable box 110 in the system to communicate with all other suspendable boxes 110, a robot, or the overall system because of the power constantly supplied to the controller 810. The same would not be true if each suspendable box 110 were powered by means of power cords, which would be hopelessly tangled. Therefore, operating within an automated storage and retrieval system 1000 is one preferred application of the present invention, but many other applications also exist.

Figure 11:
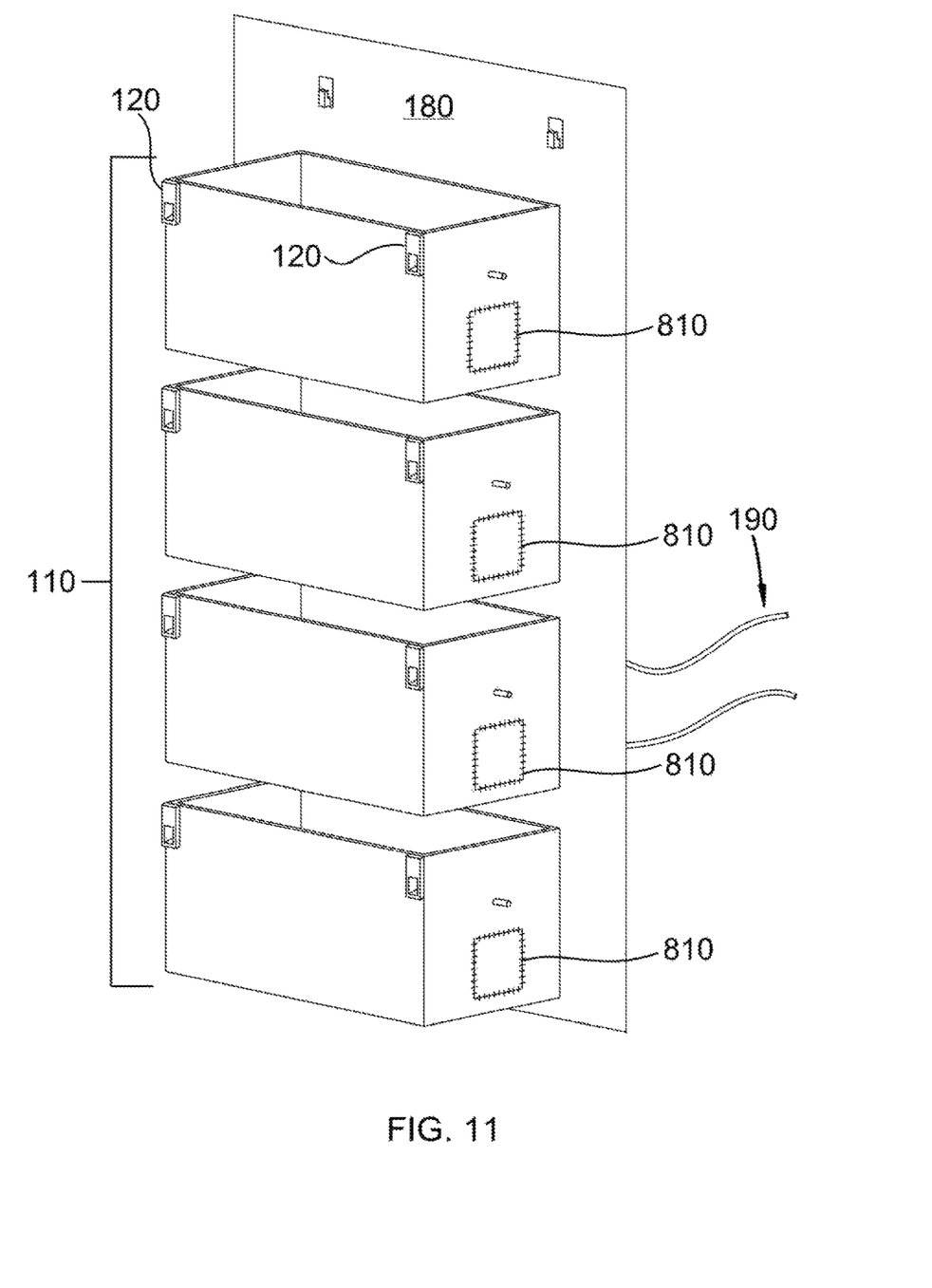
FIG. 11 depicts a system comprising one or more suspendable boxes.

FIG. 11 depicts a system comprising one or more suspendable boxes 110. Each suspendable box 110 comprises one or more electrically conductive members 120 mounted to the suspendable box 110 and a controller 810 comprising a data transceiver capable of wireless communication, such that the one or more suspendable boxes 110 can communicate with each other via their respective data transceivers. Each electrically conductive member 120 (as explained and pictured above) comprises an insulative housing 130 comprising an opening 140. The opening 140 comprises a first electrical conductor 150 that is positioned so as to engage with a second electrical conductor 160 within a wall hook 170 dimensioned to fit removably inside the electrically conductive member 120. The wall hook 170 is mounted to a wall 180 from which the suspendable box 110 may be removably suspended. The wall hook 170 is coupled to a source of electrical power 190 within the wall 180 such that the suspendable box 110 is provided with electrical power when the first electrical conductor 150 and the second electrical conductor 160 engage. In a preferred embodiment, the one or more suspendable boxes 110 are storage bins. In a preferred embodiment, the one or more suspendable boxes 110 measure approximately twelve inches tall, twelve inches deep, and twenty inches wide. In a preferred embodiment, the one or more suspendable boxes are components in an automated storage and retrieval system 1000, as described above. The controller 810 on each of the one or more suspendable boxes 110 allows the one or more suspendable boxes 110 to communicate with each other within the system, such as when the suspendable boxes 110 are components in an automated storage and retrieval system 1000. The suspendable boxes 110 can also communicate with a robot or a central system control because of the constant supply of power supplied to each of the suspendable boxes 110 from the wall hooks 170, which constant supply of power feeds each of the controllers 810. In one embodiment, the one or more suspendable boxes 110 are cooking devices that communicate by means of the controllers 810 so as to synchronize cooking times. In another embodiment, the one or more suspendable boxes 110 are storage bins that communicate their contents by means of the controller 810 to the other suspendable boxes 110 or a central control system.

The invention claimed is:

1. An apparatus comprising:
    a suspendable box comprising:
        one or more electrically conductive members mounted to the suspendable box, each electrically conductive member comprising an insulative housing comprising an opening comprising a first electrical conductor that is positioned so as to engage with a second electrical conductor within a wall hook dimensioned to fit removably inside the electrically conductive member, the wall hook mounted to a wall from which the suspendable box may be removably suspended, and the wall hook coupled to a source of electrical power within the wall such that the suspendable box is provided with electrical power when the first electrical conductor and the second electrical conductor engage; and
        a controller comprising a data transceiver capable of wireless communication, the controller being powered by the electrical power supplied to the suspendable box.

2. The apparatus of claim 1, wherein the suspendable box comprises a storage bin.

3. The apparatus of claim 1, wherein the suspendable box comprises an electrically powered appliance.

4. The apparatus of claim 1, wherein the suspendable box is one component in an automated storage and retrieval system.

5. The apparatus of claim 4, wherein the automated storage and retrieval system comprises one or more planar motion mechanisms movably mounted to a frame, a plurality of the wall hooks mounted to one or more walls of the frame, and the one or more planar motion mechanisms suspending the suspendable box from the wall hooks to reposition the suspendable box within the frame.

6. The apparatus of claim 1, wherein the suspendable box measures approximately twelve inches tall, twelve inches deep, and twenty inches wide.

7. The suspendable box of claim 1, wherein the suspendable box further comprises one or more electrical outlets into which a power cord of an electrically powered appliance can be plugged to receive power from the suspendable box.

8. The apparatus of claim 1, wherein the first and second electrical conductors comprise pins.

9. The apparatus of claim 8, wherein the pins comprise spring-loaded pins.

10. The apparatus of claim 1, comprising two electrically conductive members mounted to the suspendable box.

11. The apparatus of claim 10, wherein one electrically conductive member is hot and a second electrically conductive member is neutral.

12. The apparatus of claim 1, further comprising one or more knobs that engage with one or more end effectors of one or more robotic mechanisms.

13. A system comprising:
    one or more suspendable boxes, each suspendable box comprising:
        one or more electrically conductive members mounted to the suspendable box, each electrically conductive member comprising an insulative housing comprising an opening comprising a first electrical conductor that is positioned so as to engage with a second electrical conductor within a wall hook dimensioned to fit removably inside the electrically conductive member, the wall hook mounted to a wall from which the suspendable box may be removably suspended, and the wall hook coupled to a source of electrical power within the wall such that the suspendable box is provided with electrical power when the first electrical conductor and the second electrical conductor engage; and
        a controller comprising a data transceiver capable of wireless communication,
such that the one or more suspendable boxes can communicate with each other via their respective data transceivers.

14. The system of claim 13, wherein the one or more suspendable boxes are storage bins.

15. The system of claim 13, wherein the one or more suspendable boxes are components in an automated storage and retrieval system.

16. The system of claim 15, wherein the automated storage and retrieval system comprises one or more planar motion mechanisms movably mounted to a frame, a plurality of the wall hooks mounted to one or more walls of the frame, and the one or more planar motion mechanisms suspending the one or more suspendable boxes from the wall hooks to reposition the one or more suspendable boxes within the frame.

17. The system of claim 13, wherein the one or more suspendable boxes measure approximately twelve inches tall, twelve inches deep, and twenty inches wide.

18. The system of claim 13, wherein the one or more suspendable boxes are cooking devices that communicate so as to synchronize cooking times.

* * * * *